(12) United States Patent
Chen et al.

(10) Patent No.: US 10,783,203 B2
(45) Date of Patent: Sep. 22, 2020

(54) DATA PROCESSING METHOD AND APPARATUS

(71) Applicant: Huawei Technologies Co., Ltd., Shenzhen (CN)

(72) Inventors: Chibing Chen, Shenzhen (CN); Feng Zhu, Shenzhen (CN); Xinsheng He, Shenzhen (CN); Chuan Peng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 319 days.

(21) Appl. No.: 15/823,024

(22) Filed: Nov. 27, 2017

(65) Prior Publication Data
US 2018/0081889 A1  Mar. 22, 2018

Related U.S. Application Data

(63) Continuation of application No. PCT/CN2015/092002, filed on Oct. 15, 2015.

(30) Foreign Application Priority Data

May 28, 2015 (CN) .......................... 2015 1 0284151

(51) Int. Cl.
*G06F 16/00* (2019.01)
*G06F 16/9537* (2019.01)
(Continued)

(52) U.S. Cl.
CPC ........ *G06F 16/9537* (2019.01); *G06F 3/0608* (2013.01); *G06F 3/0611* (2013.01);
(Continued)

(58) Field of Classification Search
CPC .......... G06F 16/00; G06F 16/14; G06F 16/29; G06F 16/30; G06F 16/9537;
(Continued)

(56) References Cited

U.S. PATENT DOCUMENTS

| 6,282,540 B1 | 8/2001 | Goldensher et al. |
| 2003/0063072 A1* | 4/2003 | Brandenberg ............ G01S 5/02 345/173 |

(Continued)

FOREIGN PATENT DOCUMENTS

| CN | 1863331 A | 11/2006 |
| CN | 101375544 A | 2/2009 |

(Continued)

OTHER PUBLICATIONS

Malensek, M., et al., "Evaluating Geospatial Geometry and Proximity Queries Using Distributed Hash Tables," XP011556902, Computing in Science and Engineering, Jul. 1, 2014, 9 pages.

(Continued)

Primary Examiner — Vincent F Boccio
(74) Attorney, Agent, or Firm — Conley Rose, P.C.

(57) ABSTRACT

A data processing method is provided, wherein the method includes for each region in multiple regions, generating, according to a correspondence between location information of a user in a user group and the region, a user appearing information bit set corresponding to the region, where a bit value of each bit in the user appearing information bit set indicates whether a corresponding user in the user group appears in the region; receiving a request message carrying a region indication parameter; querying, according to the region indication parameter, for a user appearing information bit set corresponding to a region indicated by the region indication parameter, and performing data processing according to the found user appearing information bit set. Thus, a user appearing information bit set corresponding to a region is generated, thereby reducing data storage space, and increasing computing efficiency and a computing speed when performing data processing.

20 Claims, 6 Drawing Sheets

(51) Int. Cl.
*G06F 16/14* (2019.01)
*G06F 16/30* (2019.01)
*H04W 4/029* (2018.01)
*G06F 3/06* (2006.01)
*G06Q 30/02* (2012.01)
*H04W 4/02* (2018.01)

(52) U.S. Cl.
CPC ............ *G06F 3/0638* (2013.01); *G06F 16/00* (2019.01); *G06F 16/14* (2019.01); *G06F 16/30* (2019.01); *G06Q 30/0261* (2013.01); *H04W 4/02* (2013.01); *H04W 4/029* (2018.02)

(58) Field of Classification Search
CPC .... G06F 3/0608; G06F 3/0611; G06F 3/0638; G06Q 30/0261; H04W 4/02; H04W 4/029
USPC ........................................................ 707/736
See application file for complete search history.

(56) References Cited

U.S. PATENT DOCUMENTS

| | | | |
|---|---|---|---|
| 2005/0216518 | A1 | 9/2005 | Hu et al. |
| 2007/0165845 | A1 | 7/2007 | Ye et al. |
| 2008/0069093 | A1 | 3/2008 | Maestas et al. |
| 2010/0311427 | A1 | 12/2010 | Bouguen et al. |
| 2014/0307875 | A1 | 10/2014 | Reznik et al. |
| 2016/0104377 | A1 | 4/2016 | French et al. |

FOREIGN PATENT DOCUMENTS

| | | | |
|---|---|---|---|
| CN | 101421731 | A | 4/2009 |
| CN | 101645154 | A | 2/2010 |
| CN | 101983519 | A | 3/2011 |
| CN | 102264049 | A | 11/2011 |
| CN | 102932899 | A | 2/2013 |
| CN | 103052043 | A | 4/2013 |
| CN | 103177380 | A | 6/2013 |
| EP | 2339872 | A1 | 6/2011 |
| WO | 2010031294 | A1 | 3/2010 |
| WO | 2014005654 | A1 | 1/2014 |

OTHER PUBLICATIONS

Foreign Communication From a Counterpart Application, European Application No. 15893095.8, Extended European Search Report dated Feb. 16, 2018, 10 pages.
Machine Translation and Abstract of Chinese Publication CN102932899, Feb. 13, 2013, 53 pages.
Machine Translation and Abstract of Chinese Publication CN103177380, Jun. 26, 2013, 8 pages.
Foreign Communication From a Counterpart Application, Chinese Application No. 201510284151.9, Chinese Office Action dated Mar. 1, 2019, 5 pages.
Machine Translation and Abstract of Chinese Publication No. CN1863331, Nov. 15, 2006, 23 pages.
Machine Translation and Abstract of Chinese Publication No. CN101645154, Feb. 10, 2010, 16 pages.
Machine Translation and Abstract of Chinese Publication No. CN102264049, Nov. 30, 2011, 13 pages.
Machine Translation and Abstract of Chinese Publication No. CN103052043, Apr. 17, 2013, 6 pages.
Foreign Communication From a Counterpart Application, PCT Application No. PCT/CN2015/092002, English Translation of International Search Report dated Feb. 29, 2016, 2 pages.
Foreign Communication From a Counterpart Application, PCT Application No. PCT/CN2015/092002, English Translation of Written Opinion dated Feb. 29, 2016, 8 pages.
Foreign Communication From a Counterpart Application, Chinese Application No. 201510284151.9, Chinese Notice of Allowance dated Oct. 8, 2019, 4 pages.

\* cited by examiner

DATA PROCESSING METHOD AND APPARATUS

CROSS-REFERENCE TO RELATED APPLICATIONS

This application is a continuation of International Application No. PCT/CN2015/092002, filed on Oct. 15, 2015, which claims priority to Chinese Patent Application No. 201510284151.9, filed on May 28, 2015. The disclosures of the aforementioned applications are hereby incorporated by reference in their entireties.

TECHNICAL FIELD

The present disclosure relates to the communications field, and in particular, to a data processing method and apparatus.

BACKGROUND

Currently, when an operator performs work such as marketing or product planning, a large amount of user data usually needs to be processed, so as to determine a target customer according to a data processing result, thereby performing promotion and recommendation. However, currently, before user data is processed, a huge amount of user data needs to be stored, which causes that a large amount of data storage space is occupied, and a large amount of data is stored repeatedly. When data processing is performed using the data, a huge amount of data is searched, a speed is slow, and resource consumption is high. In addition, usually, a user identity (ID) needs to be used for filtering to obtain a user that meets a condition, a speed is slow, and efficiency is low.

SUMMARY

Embodiments of the present disclosure provide a data processing method and apparatus, to generate a user appearing information bit set corresponding to a region, thereby greatly reducing data storage space, and increasing computing efficiency and a computing speed when data processing is performed.

According to a first aspect, a data processing method is provided, where the method includes for one region in multiple regions, generating, according to a correspondence between location information of a user in a user group and the region, a user appearing information bit set corresponding to the region, where the location information indicates a location at which the user appears, bits in the user appearing information bit set are in a one-to-one correspondence with users in the user group, and a bit value of each bit in the user appearing information bit set indicates whether a corresponding user in the user group appears in the region; receiving a request message, where the request message carries a region indication parameter; and querying, according to the region indication parameter, for a user appearing information bit set corresponding to a region indicated by the region indication parameter, and performing data processing according to the found user appearing information bit set.

With reference to the first aspect, in a first possible implementation manner of the first aspect, the generating, according to a correspondence between location information of a user in a user group and the region, a user appearing information bit set corresponding to the region includes obtaining location information of a user that has a target service feature in the user group, and generating, according to a correspondence between the location information of the user that has the target service feature and the region, the user appearing information bit set corresponding to the region.

With reference to the first aspect, or the first possible implementation manner of the first aspect, in a second possible implementation manner, the location information of the user in the user group includes one of the following two types of information: geographic location information of each user in the user group; or information indicating that at least one user in the user group appears in the region.

With reference to the first aspect, or the first or the second possible implementation manners of the first aspect, in a third possible implementation manner, the location information of the user in the user group further includes time information when the user appears at the location in the location information; and a time length is divided into M time periods, where M is an integer greater than 1, and a user appearing information bit set corresponding to one time period and the region is generated according to a correspondence between a moment in the location information and the time period.

With reference to the first aspect, or the first to the third possible implementation manners of the first aspect, in a fourth possible implementation manner, the request message further carries a time period indication parameter; and a user appearing information bit set corresponding to a time period indicated by the time period indication parameter and the region indicated by the region indication parameter is queried for according to the time period indication parameter and the region indication parameter.

With reference to the first aspect, or the first to the fourth possible implementation manners of the first aspect, in a fifth possible implementation manner, the generating a user appearing information bit set corresponding to the time period and the region includes determining that different locations at which the user appears within a same time period correspond to different regions, where all bit values that are in appearing information bit sets of regions at which the user appears within the same time period and that correspond to the user indicate appearing.

With reference to the first aspect, or the first to the fifth possible implementation manners of the first aspect, in a sixth possible implementation manner, the method further includes for one attribute of at least one attribute in the user group, generating an attribute information bit set corresponding to the attribute, where bits in the attribute information bit set are in a one-to-one correspondence with the users in the user group, and a bit value of each bit in the attribute information bit set indicates whether a corresponding user in the user group has an attribute corresponding to the attribute information bit set.

With reference to the first aspect, or the first to the sixth possible implementation manners of the first aspect, in a seventh possible implementation manner, the request message further carries an attribute indication parameter; and an attribute information bit set corresponding to an attribute indicated by the attribute indication parameter is queried for according to the attribute indication parameter, and data processing is performed according to the found attribute information bit set.

With reference to the first aspect, or the first to the seventh possible implementation manners of the first aspect, in an eighth possible implementation manner, the attribute includes at least one of a gender attribute, an age attribute, a package attribute, a level attribute, a preference attribute, or an identity attribute, where the identity attribute is related to a region.

With reference to the first aspect, or the first to the eighth possible implementation manners of the first aspect, in a ninth possible implementation manner, the request message further carries a user information indication parameter, and the user information indication parameter indicates at least one to-be-selected user; and a user filtering information bit set corresponding to the user group is generated according to the user information indication parameter, where bits in the user filtering information bit set are in a one-to-one correspondence with the users in the user group, and a bit value of each bit in the user filtering information bit set indicates whether to select a corresponding user in the user group.

With reference to the first aspect, or the first to the ninth possible implementation manners of the first aspect, in a tenth possible implementation manner, data processing is performed according to the user filtering information bit set and the found user appearing information bit set.

With reference to the first aspect, or the first to the tenth possible implementation manners of the first aspect, in an eleventh possible implementation manner, the performing data processing is performing a logical operation according to the found user appearing information bit set and a logical operator indication parameter in the request message.

With reference to the first aspect, or the first to the eleventh possible implementation manners of the first aspect, in a twelfth possible implementation manner, the location information of the user that has the target service feature includes location information of a user that uses at least one target service in the user group, where the target service includes at least one of a short messaging service, a voice service, a data service, or an application.

With reference to the first aspect, or the first to the twelfth possible implementation manners of the first aspect, in a thirteenth possible implementation manner, the location information of the user that has the target service feature includes location information that is of a user in the user group and that is obtained by positioning in a target positioning manner, where the target positioning manner includes at least one of global positioning system (GPS) positioning, cell positioning, small cell positioning, Wi-Fi positioning, base station sector positioning, or indoor base station positioning.

According to a second aspect, a data processing apparatus is provided, including a generation module, a receiving module, and a processing module, where the generation module is configured to, for one region in multiple regions, generate, according to a correspondence between location information of a user in a user group and the region, a user appearing information bit set corresponding to the region, where the location information indicates a location at which the user appears, bits in the user appearing information bit set are in a one-to-one correspondence with users in the user group, and a bit value of each bit in the user appearing information bit set indicates whether a corresponding user in the user group appears in the region; the receiving module is configured to receive a request message, where the request message carries a region indication parameter; and the processing module is configured to query, according to the region indication parameter, for a user appearing information bit set corresponding to a region indicated by the region indication parameter, and perform data processing according to the found user appearing information bit set.

With reference to the second aspect, in a first possible implementation manner of the second aspect, the apparatus further includes an obtaining module, where the obtaining module is configured to obtain location information of a user that has a target service feature in the user group; and the generating, according to a correspondence between location information of a user in a user group and the region, a user appearing information bit set corresponding to the region includes generating, according to a correspondence between the location information of the user that has the target service feature and the region, the user appearing information bit set corresponding to the region.

With reference to the second aspect, or the first possible implementation manner of the second aspect, in a second possible implementation manner, the location information of the user in the user group includes one of the following two types of information: geographic location information of each user in the user group; or information indicating that at least one user in the user group appears in the region.

With reference to the second aspect, or the first or the second possible implementation manners of the second aspect, in a third possible implementation manner, the location information of the user in the user group further includes time information when the user appears at the location in the location information; and the generation module is further configured to divide a time length into M time periods, where M is an integer greater than 1, and generate, according to a correspondence between a moment in the location information and one time period, a user appearing information bit set corresponding to the time period and the region.

With reference to the second aspect, or the first to the third possible implementation manners of the second aspect, in a fourth possible implementation manner, the request message further carries a time period indication parameter; and the processing module is configured to query, according to the time period indication parameter and the region indication parameter, for a user appearing information bit set corresponding to a time period indicated by the time period indication parameter and the region indicated by the region indication parameter.

With reference to the second aspect, or the first to the fourth possible implementation manners of the second aspect, in a fifth possible implementation manner, the generating a user appearing information bit set corresponding to the time period and the region includes determining that different locations at which the user appears within a same time period correspond to different regions, where all bit values that are in appearing information bit sets of regions at which the user appears within the same time period and that correspond to the user indicate appearing.

With reference to the second aspect, or the first to the fifth possible implementation manners of the second aspect, in a sixth possible implementation manner, the generation module is further configured to, for one attribute of at least one attribute in the user group, generate an attribute information bit set corresponding to the attribute, where bits in the attribute information bit set are in a one-to-one correspondence with the users in the user group, and a bit value of each bit in the attribute information bit set indicates whether a corresponding user in the user group has an attribute corresponding to the attribute information bit set.

With reference to the second aspect, or the first to the sixth possible implementation manners of the second aspect, in a seventh possible implementation manner, the request message further carries an attribute indication parameter; and the processing module is configured to query, according to the attribute indication parameter, an attribute information bit set corresponding to an attribute indicated by the attribute indication parameter, and perform data processing according to the found attribute information bit set.

With reference to the second aspect, or the first to the seventh possible implementation manners of the second aspect, in an eighth possible implementation manner, the attribute includes at least one of a gender attribute, an age attribute, a package attribute, a level attribute, a preference attribute, or an identity attribute, where the identity attribute is related to a region.

With reference to the second aspect, or the first to the eighth possible implementation manners of the second aspect, in a ninth possible implementation manner, the request message further carries a user information indication parameter, and the user information indication parameter indicates at least one to-be-selected user; and the generation module generates, according to the user information indication parameter, a user filtering information bit set corresponding to the user group, where bits in the user filtering information bit set are in a one-to-one correspondence with the users in the user group, and a bit value of each bit in the user filtering information bit set indicates whether to select a corresponding user in the user group.

With reference to the second aspect, or the first to the ninth possible implementation manners of the second aspect, in a tenth possible implementation manner, the processing module performs data processing according to the user filtering information bit set and the found user appearing information bit set.

With reference to the second aspect, the first to the tenth possible implementation manners of the second aspect, in an eleventh possible implementation manner, the performing data processing is performing a logical operation according to the found user appearing information bit set and a logical operator indication parameter in the request message.

With reference to the second aspect, or the first to the eleventh possible implementation manners of the second aspect, in a twelfth possible implementation manner, the location information of the user that has the target service feature includes location information of a user that uses at least one target service in the user group, where the target service includes at least one of a short messaging service, a voice service, a data service, or an application.

With reference to the second aspect, or the first to the twelfth possible implementation manners of the second aspect, in a thirteenth possible implementation manner, the location information of the user that has the target service feature includes location information that is of a user in the user group and that is obtained by positioning in a target positioning manner, where the target positioning manner includes at least one of GPS positioning, cell positioning, small cell positioning, Wi-Fi positioning, base station sector positioning, or indoor base station positioning.

According to a third aspect, a computer device is provided, including a processor, a memory, a bus, and a communications interface, where the memory is configured to store a computing device execution instruction; the processor and the memory are connected using the bus; and when the computing device is running, the processor executes the computer execution instruction stored in the memory, so that the computing device executes the method according to any one of the first aspect to the second aspect or the possible implementation manners in the first aspect to the second aspect.

According to the technical solutions provided in the embodiments of the present disclosure, a user appearing information bit set corresponding to a region is generated according to a correspondence between location information of a user in a user group and the region, thereby greatly reducing data storage space; and a user appearing information bit set corresponding to a region indicated by a region indication parameter is queried for according to the region indication parameter, and data processing is performed according to the found user appearing information bit set, thereby greatly increasing computing efficiency and a computing speed.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

In the following description, to illustrate rather than limit, specific details such as a particular system structure, an interface, and a technology are provided to make a thorough understanding of the present disclosure. However, a person skilled in the art should know that the present disclosure may be practiced in other embodiments without these specific details. In other cases, detailed descriptions of well-known apparatuses, circuits, and methods are omitted, so that the present disclosure is described without being obscured by unnecessary details.

To facilitate understanding and describing the embodiments provided in the present disclosure, several concepts related to the present disclosure are described first. Precise positioning includes at least one of the following two manners: obtaining, by a user terminal, location information of a user, including obtaining the location information of the user using an application having a positioning function on the user terminal; or determining location information of a user by analyzing signal strength and an angle that are used to access a base station by the user. Fuzzy positioning includes determining location information of a user by obtaining a location of a device accessed by the user. The device accessed by the user includes, but is not limited to, a base station sector, a wireless routing device, a small cell, and a Bluetooth® device. A location at which a user appears may be represented using a precise location, for example, but is not limited to, represented using latitude and longitude, or may be represented using a fuzzy location, for example, but is not limited to, represented using a location or an identifier of a device accessed by the user. A map involved in the present disclosure is a map on which a region is divided, and includes, but is not limited to, a geographic location map, a base station sector location map, and a floor distribution map. Multiple involved in the present disclosure is an integer number greater than or equal to 2.

Figure 1:
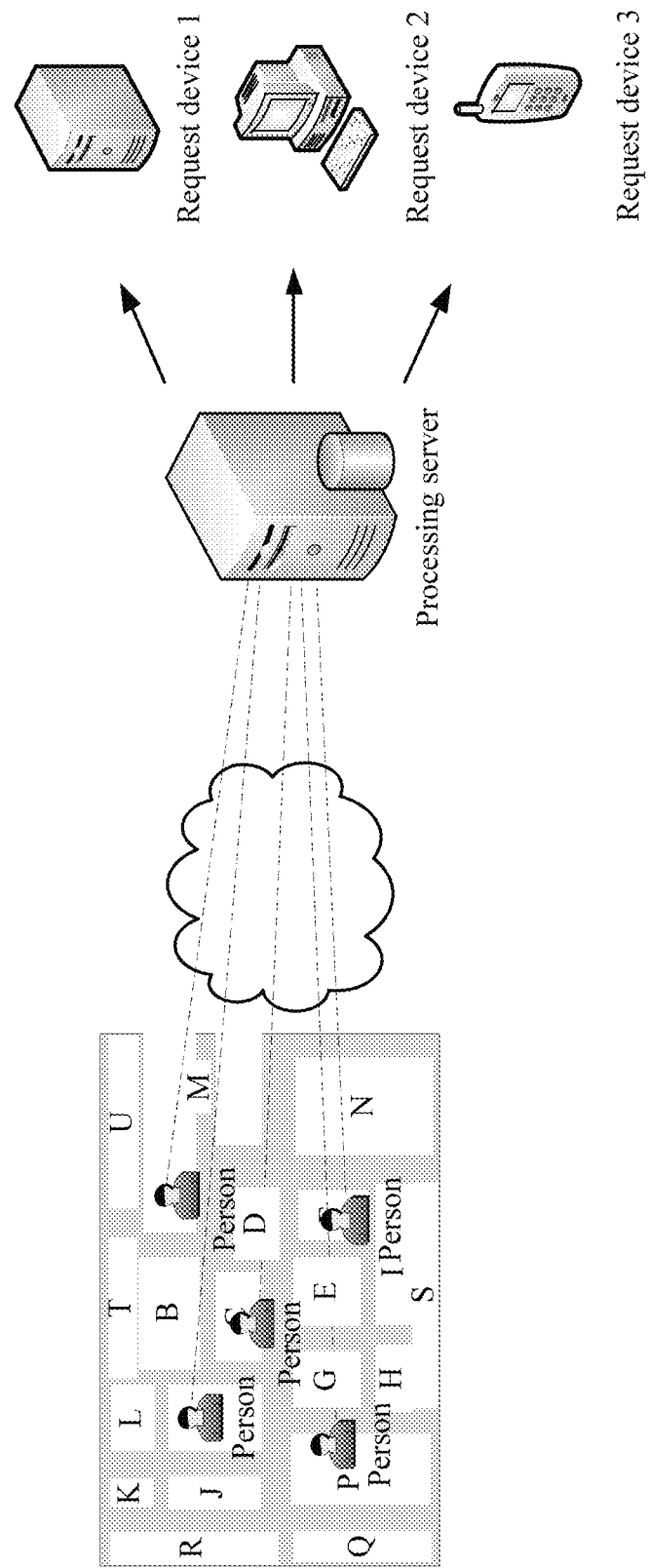
FIG. 1 is a schematic diagram of a network architecture to which the embodiments of the present disclosure are applied.

FIG. 1 is a schematic diagram of a network architecture 100 to which the embodiments of the present disclosure are applied. A computer device obtains location information of a user in a user group, and generates a user appearing information bit set according to a correspondence between the location information of the user and a region. A request device sends a request message to the computer device. The computer device searches for a corresponding user appearing information bit set according to a region indication parameter carried in the request message, performs data processing according to the found user appearing information bit set, and returns a data processing result to the request device. The request device may be, for example, but is not limited to, a server or a terminal device.

Figure 2:
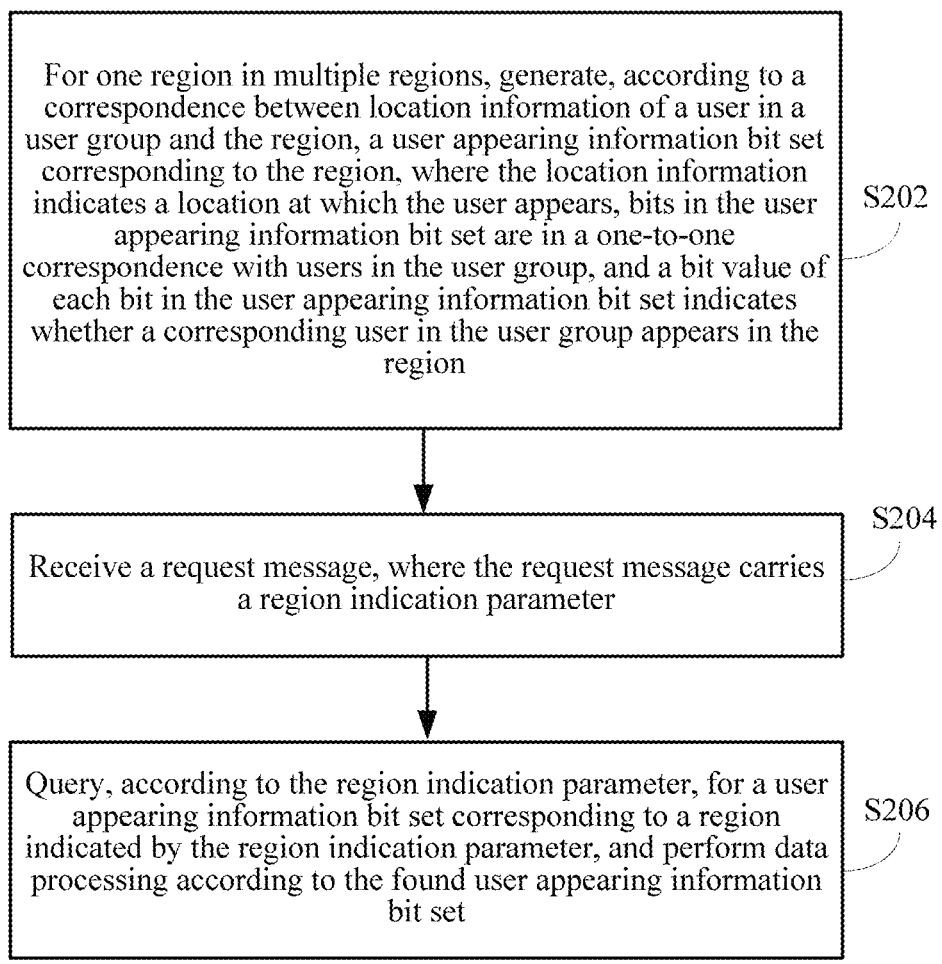
FIG. 2 is a schematic flowchart of a data processing method according to an embodiment of the present disclosure.

FIG. 2 is a schematic flowchart of a data processing method 200 according to an embodiment of the present disclosure. In a specific implementation process, the data processing method 200 may be performed by, for example, but not limited to, a computer device, and the computer device may be, for example, but is not limited to, a data processing platform or a processing server.

S202. For one region in multiple regions, the computer device generates, according to a correspondence between location information of a user in a user group and the region, a user appearing information bit set corresponding to the region, where the location information indicates a location at which the user appears, bits in the user appearing information bit set are in a one-to-one correspondence with users in the user group, and a bit value of each bit in the user appearing information bit set indicates whether a corresponding user in the user group appears in the region.

Each bit in the user appearing information bit set represents appearing information of a corresponding user in the user group.

S204. The computer device receives a request message, where the request message carries a region indication parameter.

The region indication parameter may be a row number and a column number of a region, or may be an identifier of a device accessed by a user, and the region indication parameter indicates at least one region.

S206. The computer device queries, according to the region indication parameter, for a user appearing information bit set corresponding to a region indicated by the region indication parameter, and performs data processing according to the found user appearing information bit set.

In S202, before the computer device generates, according to the correspondence between the location information of the user in the user group and the region, the user appearing information bit set corresponding to the region, the computer device divides a map into N regions, where N is an integer greater than 1. Each point on the map belongs to one region in the N regions, and there exists no point that is on the map but does not belong to the N regions. The N regions obtained through division may be N regions having a same shape and a same area, or may be divided into N different regions. The N different regions refer to that in the N regions, at least one region has a different shape from other regions, or at least one region has a different area from other regions.

When the map is divided into N regions having a same shape and a same area, the map may be divided into, for example, but not limited to, N rectangular regions having a same area and a same shape. Lengths of all the rectangular regions are parallel to each other, and widths of all the rectangular regions are parallel to each other.

When the map is divided into N different regions, using a base station sector location map as an example, one base station sector may be used as one region, and the map is divided into N regions according to base station sectors. When an indoor map is divided, because floors need to be distinguished indoors, region division needs to be separately performed for each floor. When the map is divided into N regions, the map may be divided according to, for example, but not limited to, an indoor store size or a booth range.

Before the computer device generates, according to the correspondence between the location information of the user in the user group and the region, the user appearing information bit set corresponding to the region, the computer device obtains the location information of the user in the user group, and determines the correspondence between the location information of the user and the region. The location information of the user may be obtained in a precise positioning or fuzzy positioning manner. Precise positioning includes, but is not limited to, one of GPS positioning, cell positioning, small cell positioning, or Wi-Fi positioning. Fuzzy positioning includes, but is not limited to, one of cell positioning, small cell positioning, Wi-Fi positioning, base station sector positioning, and indoor base station positioning. The location information of the user may be obtained by, for example, but not limited to, an operator or a user terminal, and then the location information of the user obtained by means of positioning is provided to the computer device.

Optionally, when precise positioning is used to obtain the location information of the user, the map may be divided into N regions having a same shape and a same area, so as to determine a region corresponding to the location information of the user. When fuzzy positioning is used to obtain the location information of the user, the map may be divided into N different regions, so as to determine a region corresponding to geographic location information of the user.

For a user appearing information bit set corresponding to one region, if the location information of the user corresponds to the region, a bit value of a bit that is in the user appearing information bit set and that corresponds to the user indicates appearing, and it represents that the user appears in the region. If the location information of the user does not correspond to the region, a bit value of a bit that is in the user appearing information bit set and that corresponds to the user indicates not appearing, and it represents that the user does not appear in the region. Appearing is represented using a bit value 1, and not appearing is represented using a bit value 0; or appearing is represented using a bit value 0, and not appearing is represented using a bit value 1. This is not limited in the present disclosure. For each region obtained through division, the computer device generates a user appearing information bit set corresponding to the region. Each user corresponds to one bit, and in user appearing information bit sets corresponding to different regions, bits corresponding to a same user have a same location.

Optionally, the location information of the user in the user group includes one of the following two types of information:

geographic location information of each user in the user group; or information indicating that at least one user in the user group appears in the region.

The following separately describes how the computer device generates, according to the foregoing two types of information, the user appearing information bit set corresponding to the region.

(1) When the location information of the user in the user group includes geographic location information of each user in the user group, specifically, the geographic location information of the user may be represented using latitude and longitude. For example, a location of a user obtained by a terminal by means of GPS positioning is 28° E and 23° N. For another example, an operator determines, using a base station sector accessed by a user, that the user is located in the sector, and a location 38° E and 33° N of the base station sector is used as a location of the user. The computer device obtains the geographic location information of each user in the user group, and determines a correspondence between the geographic location information of the user and the region. When a location at which a user appears and that is indicated by geographic location information of the user belongs to one region, the geographic location information of the user corresponds to the region.

When the map is divided into N rectangular regions having a same area and a same shape, lengths of all the rectangular regions are parallel to each other, and widths of all the rectangular regions are parallel to each other. In this case, a coordinate system may be established using a point in a lower-left corner on the map as an origin of coordinates, and the correspondence between the geographic location information of the user and the region is determined according to latitude and longitude of the origin of coordinates and the geographic location information of the user obtained by the computer device. Optionally, a row number of the region corresponding to the geographic location information of the user may be determined according to $k=((x1-x)/a)+1$, and a column number of the region corresponding to the geographic location information of the user may be determined according to $j=((y1-y)/b)+1$. The symbol "/" represents rounding down to the nearest integer, $x1$ represents latitude of the location of the user, $y1$ represents longitude of the location of the user, $x$ represents latitude of the origin of coordinates, $y$ represents longitude of the origin of coordinates, $a$ represents a latitude difference corresponding to a length of the rectangular region in a vertical direction, and $b$ represents a longitude difference corresponding to a length of the rectangular region in a horizontal direction. The computer device determines, according to the foregoing method, a region corresponding to the geographic location information of each user in the user group. There are multiple methods for determining the region corresponding to the geographic location information of the user, and the method provided in this embodiment of the present disclosure is not limited thereto.

Figure 3:
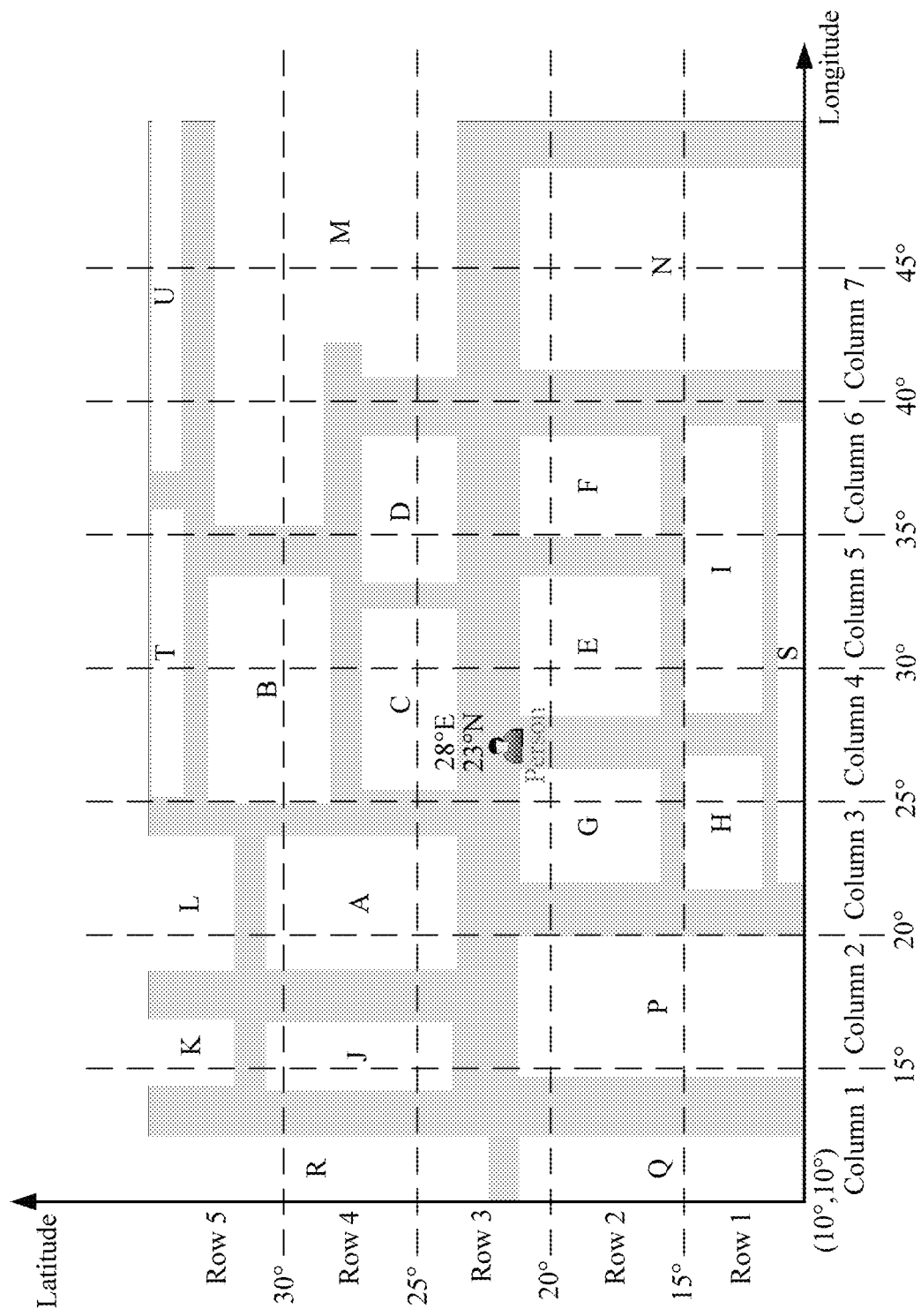
FIG. 3 is a schematic diagram of a division result of a region on a map according to an embodiment of the present disclosure.

For example, as shown in FIG. 3, using a geographic location map shown in FIG. 3 as an example, latitude and longitude of an origin of coordinates are 10° N and 10° E, users in a user group are A to J, and the computer device obtains geographic location information of the users A to J. A user A is used as an example for description, and it is assumed that a location at which the user A appears and that is indicated by geographic location information of the user A obtained by the computer device is 23° N and 28° E. If a rectangular region obtained through division is a quadrate region, a latitude difference corresponding to a side length of the quadrate region is 5°, and a longitude difference corresponding to a side length is 5°, a row number of a region corresponding to the geographic location information of the user A is determined according to $k=((x1-x)/a)+1$, and a column number of the region corresponding to the geographic location information of the user A is determined according to $j=((y1-y)/b)+1$. In FIG. 3, if $x1=23°$, $y1=28°$, $x=10°$, $y=10°$, $a=5°$, and $b=5°$, $k=((23°-10°)/5°)+1=3$, and $j=((28°-10°)/5°)+1=4$. Therefore, a location 23° N and 28° E at which the user appears and that is indicated by the geographic location information of the user A belongs to a rectangular region at the third row and the fourth column, and the geographic location information of the user A corresponds to the rectangular region at the third row and the fourth column. The computer device determines, using the same method, regions corresponding to geographic location information of users B to J. Details are not described again herein.

When the map is divided into N different regions according to a base station sector, a location or an identifier of a base station sector accessed by the user terminal is used as a location at which the user appears and that is indicated by the geographic location information of the user. Therefore, the location at which the user appears and that is indicated by the geographic location information of the user belongs to a base station sector region, and the base station sector region is the region corresponding to the geographic location information of the user. The base station sector region may be indicated using the identifier of the base station sector.

After the computer device obtains the geographic location information of each user in the user group, and determines the correspondence between the geographic location information of the user and the region, the computer device generates, according to the correspondence between the geographic location information of each user in the user group and the region, the user appearing information bit set corresponding to the region. For a user appearing information bit set corresponding to one region, if the geographic location information of the user corresponds to the region, a bit value of a bit that is in the user appearing information bit set and that corresponds to the user indicates appearing. If the geographic location information of user does not correspond to the region, a bit value of a bit that is in the user appearing information bit set and that corresponds to the user indicates not appearing. For example, using a region obtained through division in FIG. 3 as an example, assuming that a user group includes 10 users, which are users A to J, the computer device obtains the geographic location information of each user in the user group, and a location at which a user appears and that is indicated by the geographic location information of each user is as follows:

| Location | 23° N 28° E | 12° N 12° E | 23° N 28° E | 23° N 28° E | 12° N 12° E | 12° N 12° E | 12° N 12° E | 12° N 12° E | 12° N 12° E | 12° N 12° E |
|---|---|---|---|---|---|---|---|---|---|---|
| User | A | B | C | D | E | F | G | H | I | J |

A row number of a region corresponding to geographic location information of a user may be determined according to $k=((x1-x)/a)+1$, and a column number of the region corresponding to the geographic location information of the user may be determined according to $j=((y1-y)/b)+1$, to obtain that geographic location information of the users A, C, and D corresponds to the region at the third row and the fourth column, and geographic location information of the users B, E, F, G, H, I, and J corresponds to a region at the first row and the first column. Therefore, in a user appearing information bit set corresponding to the region at the third row and the fourth column, bit values of bits corresponding to the users A, C, and D are 1, and bit values of bits corresponding to the users B, E, F, G, H, I, and J are 0. In a user appearing information bit set corresponding to the region at the first row and the first column, bit values of bits corresponding to the users B, E, F, G, H, I, and J are 1, and bit values of bits corresponding to the users A, C, and D are 0. For other regions other than the region at the third row and the fourth column and the region at the first row and the first column, because the geographic location information of the users A to J does not correspond to these regions, bit values of bits that are in user appearing information bit sets corresponding to these regions and that correspond to the users A to J are 0. The computer device generates a user appearing information bit set corresponding to each region, and the user appearing information bit set may be recorded as follows:

| (1, 1) | 0 | 1 | 0 | 0 | 1 | 1 | 1 | 1 | 1 | 1 |
|---|---|---|---|---|---|---|---|---|---|---|
| (3, 4) | 1 | 0 | 1 | 1 | 0 | 0 | 0 | 0 | 0 | 0 |
| (1, 2) | 0 | 0 | 0 | 0 | 0 | 0 | 0 | 0 | 0 | 0 |
| User | A | B | C | D | E | F | G | H | I | J |

(1,1), (3,4), and (1,2) respectively represent the region at the first row and the first column, the region at the third row and the fourth column, and a region at the first row and the second column. In different regions, locations of the bits corresponding to the users A to J are the same. The foregoing table does not list user appearing information bit sets corresponding to all regions obtained through division in FIG. 3, but the computer device generates the user appearing information bit sets corresponding to all the regions obtained through division. Except the regions (1,1) and (3,4), bit values in user appearing information bit sets corresponding to other regions are the same as those in a user appearing information bit set corresponding to the region (1,2), and are 0. Therefore, due to limited space, in this example, only the user appearing information bit set corresponding to the region (1,2) is listed for example, but it does not mean that the computer device does not generate the user appearing information bit sets corresponding to the other regions.

(2) When the location information of the user in the user group includes information indicating that at least one user in the user group appears in the region. The information indicating that at least one user in the user group appears in the region may include user information of all users that appear in the region, and the user information is in a correspondence with the region. The computer device determines, according to the user information, bits that are in the user appearing information bit set corresponding to the region and that correspond to the users that appear in the region, and sets bit values of these bits to appearing. For users whose user information is not obtained, it indicates that these users do not appear in the region, and location information of these users does not correspond to the region.

Therefore, bit values of bits corresponding to these users are set to not appearing. That is, the user appearing information bit set corresponding to the region is obtained. The user information may be, for example, but is not limited to, one of a phone number, an international mobile subscriber identity (IMSI), an international mobile equipment identity (IMEI), a Unique Device Identifier (UDID), a Media Access Control (MAC) address, an Internet Protocol (IP) address, and data (cookie) stored in a user local terminal. For example, using the region obtained through division in FIG. 3 as an example, a user group includes the users A to J, and the computer device obtains phone numbers of all users that appear in the region at the third row and the fourth column, determines, according to the phone numbers, that the users that correspond to these phone numbers and that are in a user appearing information bit set corresponding to the region at the third row and the fourth column are A, B, and C, sets bit values of bits of the users A, B, and C to 1, and sets other bit values to 0. That is, the user appearing information bit set corresponding to the region is obtained, and is shown as follows:

| Bit value | 1 | 1 | 1 | 0 | 0 | 0 | 0 | 0 | 0 | 0 |
|---|---|---|---|---|---|---|---|---|---|---|
| User | A | B | C | D | E | F | G | H | I | J |

The information indicating that at least one user in the user group appears in the region may also include appearing information of all users that appear in the region. The computer device obtains the appearing information of all the users that appear in the region in the user group, and uses the obtained user appearing information as appearing information that is of the corresponding users and that is in the user appearing information bit set corresponding to the region. For users whose appearing information is not obtained, it indicates that these users do not appear in the region. Therefore, a bit value of a bit that is in the user appearing information bit set corresponding to the region and that corresponds to a user that does not appear in the region in the user group is set to not appearing. That is, the user appearing information bit set corresponding to the region is obtained. For example, using the region obtained through division in FIG. 3 as an example, a user group includes the users A to J, and the users A, B, and C appear in the region at the third row and the fourth column. Therefore, the computer device obtains user appearing information of the users A, B, and C in the region at the third row and the fourth column:

| Bit value | 1 | 1 | 1 |
|---|---|---|---|
| User | A | B | C |

The computer device uses the obtained user appearing information as appearing information that is of the users A, B, and C and that is in a user appearing information bit set corresponding to the region at the third row and the fourth column, and sets bit values of bits that correspond to users D to J and that are in the user appearing information bit set corresponding to the region at the third row and the fourth column to 0. That is, the user appearing information bit set corresponding to the region at the third row and the fourth column is obtained:

| Bit value | 1 | 1 | 1 | 0 | 0 | 0 | 0 | 0 | 0 | 0 |
|---|---|---|---|---|---|---|---|---|---|---|
| User | A | B | C | D | E | F | G | H | I | J |

In (1), because the geographic location information of each user in the user group obtained by the computer device is not specific to one region, a region to which a location at which a user appears and that is indicated by geographic location information of the user belongs needs to be determined, so as to determine the correspondence between the location information of the user in the user group and the region. However, in (2), a location at which the user appears and that is indicated by the location information of the user in the user group belongs to one specific region, and there is a correspondence. Therefore, it is unnecessary to determine the correspondence between the location information of the user in the user group and the region according to the location at which the user appears.

The user group may be, for example, but is not limited to, multiple users of one city, one county, or one town, and is determined according to a specific need. This is not limited in the present disclosure.

Compared with storing the location information of the user, recording appearing information of the user by means of a binary bit set minimizes space occupied by data storage.

For a same map, a smaller area of each region obtained through division indicates higher precision of determining a region corresponding to user location information, and larger storage space is needed for storing a user appearing information bit set.

Optionally, the location information of the user in the user group further includes time information when the user appears at the location in the location information. The computer device divides a time length into M time periods, where M is an integer greater than 1, and generates, according to a correspondence between a moment in the location information and one time period, a user appearing information bit set corresponding to the time period and the region. The time information may be, for example, but is not limited to, a moment or a time period.

For each time period obtained through division, the computer device generates a user appearing information bit set corresponding to each region obtained through division. In user appearing information bit sets corresponding to different time periods, locations of bits corresponding to a same user are the same.

Figure 4:
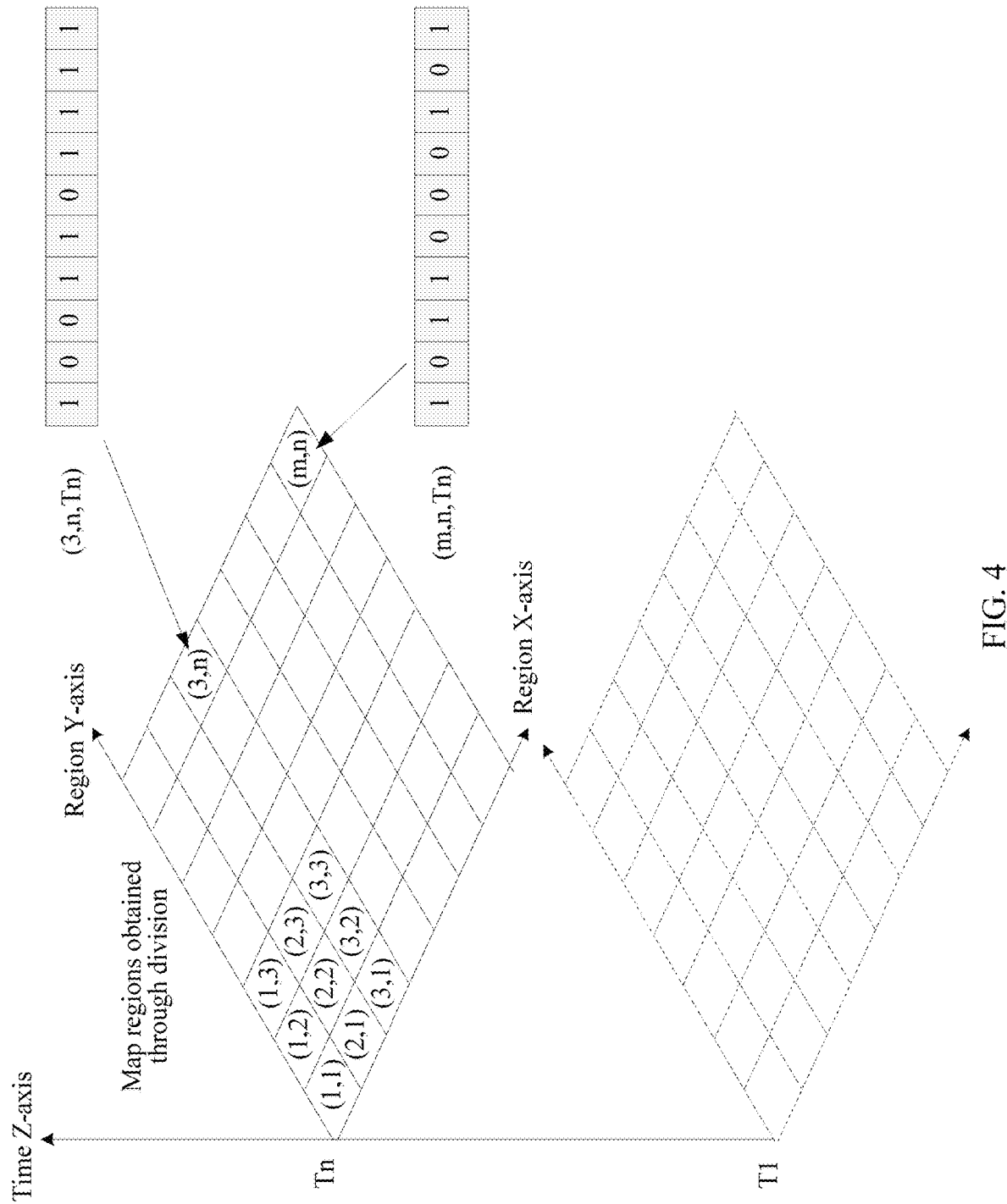
FIG. 4 is a schematic diagram of a relationship between a user appearing information bit set and a region as well as a time according to an embodiment of the present disclosure.

As shown in FIG. 4, a region X-axis represents column numbers of regions, a region Y-axis represents row numbers of regions, and a time Z-axis represents time periods obtained through division. User appearing information bit sets generated by the computer device correspond to the regions and the time periods.

For example, the computer device divides one day into 24 time periods, and duration of each time period is one hour. Using a region obtained through division in FIG. 3 as an example, a user group includes the users A to J, which correspond to a time period 8:00 to 9:00. A user appearing information bit set that corresponds to a region at the second row and the fifth column and that is generated by the computer device may be recorded as follows:

| (2, 5, 8:00-9:00) | 1 | 0 | 1 | 1 | 1 | 0 | 1 | 0 | 0 | 1 |
|---|---|---|---|---|---|---|---|---|---|---|
| User | A | B | C | D | E | F | G | H | I | J |

The user appearing information bit set represents whether the user group A to J appears in the region at the second row and the fifth column within the time period 8:00 to 9:00. Users that appear in the region at the second row and the fifth column within the time period 8:00 to 9:00 are A, C, D, E, G, and J, and users that do not appear in the region are B, F, H, and I.

In other time periods other than the time period 8:00 to 9:00, for the user group A to J, the computer device also generates user appearing information bit sets corresponding to the region at the second row and the fifth column. For other regions other than the region at the second row and the fifth column, the computer device also generates user appearing information bit sets that correspond to all time periods including the time period 8:00 to 9:00 and that correspond to these regions.

Optionally, the generating a user appearing information bit set corresponding to the time period and the region includes determining that different locations at which the user appears within a same time period correspond to different regions, where all bit values that are in appearing information bit sets of regions at which the user appears within the same time period and that correspond to the user indicate appearing.

For example, a location at which the user A appears within 8:00 to 8:30 is 18° N and 33° E, and belongs to the region at the second row and the fifth column, and a location at which the user A appears within 8:31 to 9:00 is 23° N and 33° E, and belongs to a region at the third row and the fifth column. Therefore, for the time period 8:00 to 9:00, a bit value of a bit that corresponds to the user A and that is in a user appearing information bit set corresponding to the region at the second row and the fifth column is 1, and a bit value of a bit that corresponds to the user A and that is in the user appearing information bit set corresponding to the region at the third row and the fifth column is also 1.

In a manner of dividing a map into regions, dividing a time length into time periods, and generating, according to location information of a user in a user group, a user appearing information bit set corresponding to a time period and a region, a total quantity of data entries of the user appearing information bit set is fixed, and data storage space is minimized.

Optionally, if the user group initially includes P users, and Q users are added from a moment T, where both P and Q are integers greater than 0, appearing information of the newly-added Q users before the moment T is not appearing, and bit values are 0. In this case, bits of the newly-added Q users that are used to represent the appearing information may be added after bits of the initial P users that are used to represent appearing information. For example, if the user group initially includes 10 users, and five users are added from Mar. 18, 2015, appearing information of the newly-added five users before Mar. 18, 2015 is not appearing, bit values are 0, and a user appearing information bit set of 15 users that corresponds to one region before Mar. 18, 2015 may be represented as follows:

1 0 0 1 0 1 1 1 0 1 0 0 0 0 0

The last 5 bits represent the appearing information of the newly-added five users.

Optionally, for one attribute in at least one attribute of the user group, the computer device generates an attribute information bit set corresponding to the attribute, where bits in the attribute information bit set are in a one-to-one correspondence with the users in the user group, and a bit value of each bit in the attribute information bit set indicates whether a corresponding user in the user group has an attribute corresponding to the attribute information bit set. Having the attribute is represented using a bit value 1, and not having the attribute is represented using a bit value 0; or having the attribute is represented using a bit value 0, and not having the attribute is represented using a bit value 1. This is not limited in the present disclosure. Each user corresponds to one bit, and a location of a bit corresponding to a user in the attribute information bit set is the same as a location of a bit corresponding to the user in a user appearing information bit set.

Each bit in the attribute information bit set represents attribute information of a corresponding user in the user group.

Optionally, the attribute includes at least one of a gender attribute, an age attribute, a package attribute, a level attribute, a preference attribute, or an identity attribute, where the identity attribute is related to a region.

For example, the gender attribute includes male and female, the age attribute includes the young, the middle-aged, and the aged, and the preference attribute may be, for example, a preference for WeChat and a preference for online shopping. Using users A to J in the foregoing user group as an example, a user attribute information bit set includes:

| Male | 0 | 0 | 1 | 0 | 1 | 1 | 0 | 1 | 0 | 0 |
|---|---|---|---|---|---|---|---|---|---|---|
| Female | 1 | 1 | 0 | 1 | 0 | 0 | 1 | 0 | 1 | 1 |
| Young | 1 | 1 | 0 | 0 | 0 | 1 | 1 | 1 | 0 | 1 |
| Preference for WeChat | 1 | 0 | 1 | 1 | 1 | 0 | 1 | 0 | 0 | 1 |
| User | A | B | C | D | E | F | G | H | I | J |

Optionally, the identity attribute includes a role of a user in one region, and may be, for example, but is not limited to, a worker, a habitant, an entertainer, and a visitor. Because the identity attribute is related to a region, a same user may have different identity attributes in different regions.

For example, using the region obtained through division in FIG. 3 as an example, for the region at the second row and the fifth column, and identity attribute information of the users A to J includes:

| Worker | 1 | 1 | 1 | 1 | 0 | 0 | 1 | 1 | 1 | 0 |
|---|---|---|---|---|---|---|---|---|---|---|
| Habitant | 0 | 0 | 1 | 0 | 1 | 1 | 0 | 0 | 1 | 0 |
| User | A | B | C | D | E | F | G | H | I | J |

Attribute information of a user is recorded by means of a binary bit set, thereby minimizing storage space occupied by each piece of attribute information.

In S206, optionally, the performing data processing is performing a logical operation according to the found user appearing information bit set and a logical operator indication parameter in the request message.

The logical operator indication parameter is used to indicate performing logical operations such as "and" and "or". The computer device finds, according to the region indication parameter, the user appearing information bit set corresponding to the region indicated by the region indication parameter, and performs the logical operation according to the logical operator indication parameter and the found user appearing information bit set. In a logical operation process, the computer device performs logical operations on bit values of bits that are in different user appearing information bit sets and that correspond to a same user.

For example, using the region obtained through division in FIG. 3 as an example, if a user that appears both in the region at the second row and in the region at the third row and the fifth column needs to be obtained, using the user group A to J as an example, the request message carries region indication parameters (2,5) and (3,5) and a logical operator indication parameter indicating an "and" operator, and the computer device finds the following information according to the region indication parameters (2,5) and (3,5).

| (2, 5) | 1 | 0 | 1 | 1 | 1 | 0 | 1 | 0 | 0 | 1 |
|---|---|---|---|---|---|---|---|---|---|---|
| (3, 5) | 1 | 1 | 0 | 1 | 1 | 1 | 1 | 1 | 1 | 1 |
| User | A | B | C | D | E | F | G | H | I | J |

The computer device performs an "and" operation on bit values of bits that correspond to a same user and that are both in an appearing information bit set corresponding to the region at the second row and the fifth column and in an appearing information bit set corresponding to the region at the third row and the fifth column, to obtain that users that appear both in the region at the second row and the fifth column and in the region at the third row and the fifth column are A, D, E, G, and J.

In S204 and S206, optionally, the request message further carries a time period indication parameter, and the computer device queries, according to the time period indication parameter and the region indication parameter, for a user appearing information bit set corresponding to a time period indicated by the time period indication parameter and the region indicated by the region indication parameter.

The time period indication parameter indicates at least one time period. In a specific implementation process, a quantity of time periods indicated by the time period indication parameter and a quantity of regions indicated by the region indication parameter are determined according to a specific need, and are not limited in the present disclosure. The computer device performs a logical operation according to the found user appearing information bit set and the logical operator indication parameter.

Optionally, the request message further carries an attribute indication parameter, and the computer device queries, according to the attribute indication parameter, for an attribute information bit set corresponding to an attribute indicated by the attribute indication parameter, and performs data processing according to the found attribute information bit set.

The attribute indication parameter indicates at least one attribute.

For example, using the region obtained through division in FIG. 3 as an example, if a young female user that works in the region at the second row and the fifth column, that appears in the region within the time period 8:00 to 10:00, and that prefers to use WeChat needs to be obtained, using the user group A to J as an example, the request message carries a region indication parameter (2,5), a time period indication parameter (8:00,10:00), an attribute indication parameter (Female, Young, WeChat, worker), and a logical operator indication parameter indicating an "or" operator and an "and" operator, and the computer device finds the following information according to the region indication parameter (2,5), the time period indication parameter (8:00, 10:00), and the attribute indication parameter (Female, Young, WeChat, worker).

| (2, 5, 8:00-9:00) | 1 | 0 | 1 | 1 | 1 | 0 | 1 | 0 | 0 | 1 |
|---|---|---|---|---|---|---|---|---|---|---|
| (2, 5, 9:00-10:00) | 1 | 0 | 0 | 0 | 1 | 0 | 0 | 0 | 0 | 1 |
| Female | 1 | 1 | 0 | 1 | 0 | 0 | 1 | 0 | 1 | 1 |
| Young | 1 | 1 | 0 | 0 | 0 | 1 | 1 | 1 | 0 | 1 |
| Preference for WeChat | 1 | 0 | 1 | 1 | 1 | 0 | 1 | 0 | 0 | 1 |

| Worker | 1 | 1 | 1 | 1 | 0 | 0 | 1 | 1 | 1 | 0 |
|---|---|---|---|---|---|---|---|---|---|---|
| User | A | B | C | D | E | F | G | H | I | J |

The computer device performs an "or" operation on bit values of bits that correspond to a same user and that are both in a user appearing information bit set corresponding to the region at the second row and the fifth column within the time period 8:00 to 9:00 and in a user appearing information bit set corresponding to the region within the time period 9:00 to 10:00, and then performs an "and" operation on a result of the "or" operation and a bit value of a bit that corresponds to the same user and that is in each attribute information bit set, to obtain that users that meet the condition are A and G.

In a manner of performing data processing by a computer device according to a user appearing information bit set and an attribute information bit set using a logical operation, a time of analyzing and filtering location information and attribute information is greatly shortened, and computing efficiency and a computing speed are significantly increased.

Optionally, when the request message requests location information of at least one specific user in the user group, the request message further carries a user information indication parameter, and the user information indication parameter indicates at least one to-be-selected user. The computer device generates, according to the user information indication parameter, a user filtering information bit set corresponding to the user group, where bits in the user filtering information bit set are in a one-to-one correspondence with the users in the user group, and a bit value of each bit in the user filtering information bit set indicates whether to select a corresponding user in the user group. Each user corresponds to one bit, and a location of a bit that corresponds to a user and that is in the user filtering information bit set is the same as a location of a bit that corresponds to the user and that is in the user appearing information bit set. The computer device finds the to-be-selected user according to the user information indication parameter, and sets, a bit value of a bit that corresponds to the to-be-selected user and that is in the user filtering information bit set to selecting. If the user information indication parameter does not indicate to a to-be-selected user, a bit value of a bit that corresponds to the user and that is in the user filtering information bit set is set to not selecting. That is, the user filtering information bit set corresponding to the user group is obtained. Selecting is represented using a bit value 1, and not selecting is represented using a bit value 0; or selecting is represented using a bit value 0, and not selecting is represented using a bit value 1.

Optionally, the computer device performs data processing according to the user filtering information bit set and the found user appearing information bit set. The computer device performs a logical operation on the user filtering information bit set and the user appearing information bit set according to a logical operator indication parameter in the request message, and may obtain requested location information of at least one specific user. When the request message further carries an attribute information indication parameter, a logical operation is performed on the user filtering information bit set, the user appearing information bit set, and the attribute information bit set, to obtain requested location information of at least one specific user. When the request message does not carry the user information indication parameter, or the user information indication parameter carried in the request message does not indicate selecting a user, the user filtering information bit set may not be used in a data processing process. The requested location information of the at least one specific user in the user group may be used for location distribution analysis of the specific user.

For example, using the user group A to J as an example, when the user information indication parameter carried in the request message indicates selecting users whose phone numbers are 13900001111 and 13900002222, the computer device finds, according to the user information indication parameter, that the to-be-selected users are A and B, and the computer device sets bit values of bits that are in a user filtering information bit set corresponding to the user group and that correspond to the users A and B to 1, and sets bit values of bits corresponding to users C to J to 0. Therefore, the user filtering information bit set corresponding to the user group A to J is obtained and may be recorded as follows:

| filter | 1 | 1 | 0 | 0 | 0 | 0 | 0 | 0 | 0 | 0 |
|---|---|---|---|---|---|---|---|---|---|---|
| User | A | B | C | D | E | F | G | H | I | J |

Then the computer device finds corresponding information according to the region indication parameter, the time period indication parameter, and the attribute indication parameter in the request message, and performs an "and" operation on the found corresponding information and the user filtering information bit set. That is, location information of the users A and B may be obtained.

Optionally, when storing the user appearing information bit set, the attribute information bit set, and the user filtering information bit set, the computer device may perform compression processing on consecutive "1" and "0" using a compression algorithm, thereby further reducing storage space.

The region indication parameter, the time period indication parameter, the attribute indication parameter, and the user information indication parameter may be carried in a same request message to be sent, or may be carried in multiple request messages to be sent. This is not limited in the present disclosure. Preferably, for the user appearing information bit set, when "appearing" is represented using a bit value 1, in the attribute information bit set, "having an attribute" is represented using the bit value 1, and in the user filtering information bit set, "selecting" is represented using the bit value 1. Alternatively, for the user appearing information bit set, when "appearing" is represented using a bit value 0, in the attribute information bit set, "having an attribute" is represented using the bit value 0, and in the user filtering information bit set, "selecting" is represented using the bit value 0.

According to the technical solution provided in this embodiment of the present disclosure, a computer device generates, according to a correspondence between location information of a user in a user group and a region, a user appearing information bit set corresponding to the region, and generates, according to an attribute of the user group, an attribute information bit set corresponding to the attribute, thereby minimizing storage space occupied by each piece of location information and each piece of attribute information, and greatly reducing data storage space. In a manner of dividing a map into regions, and dividing a time length into time periods, to generate a user appearing information bit set, a total quantity of data entries of the user appearing information bit set is fixed, thereby minimizing the data storage space. In a manner of performing data processing using a logical operation, a time of analyzing and filtering location information and attribute information is greatly shortened, and computing efficiency and a computing speed are significantly increased.

Figure 5:
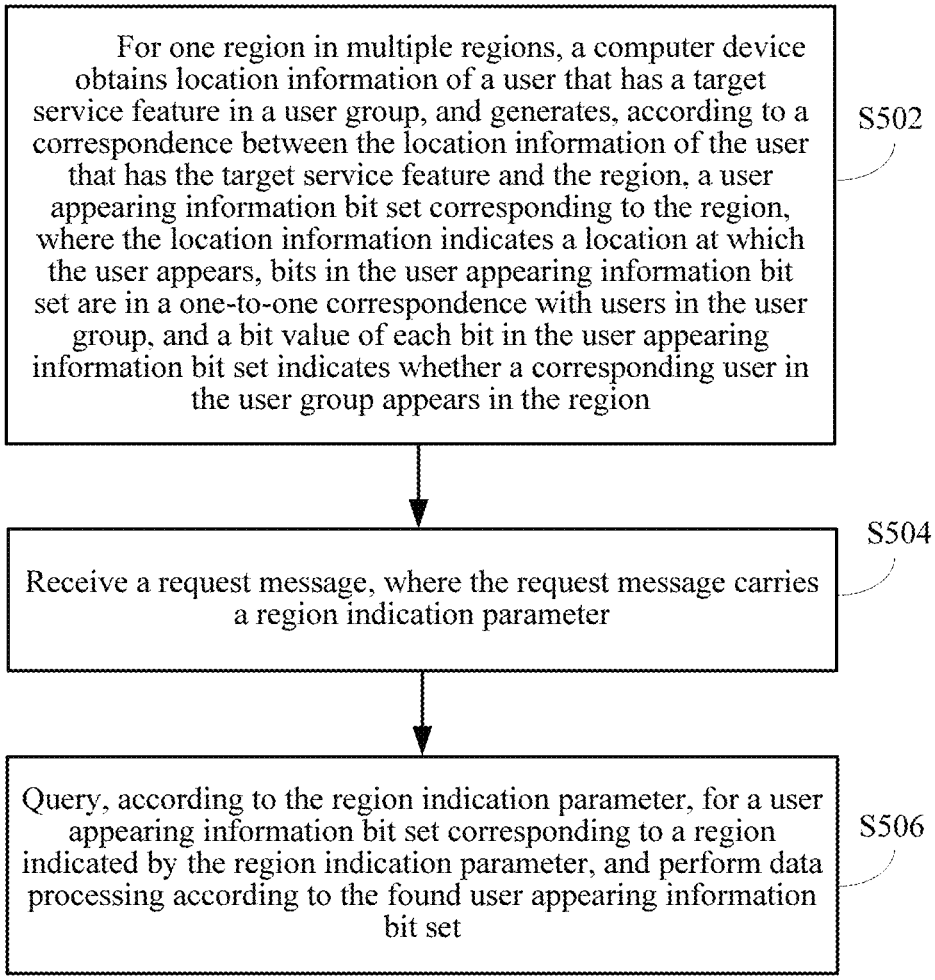
FIG. 5 is a schematic flowchart of a data processing method according to another embodiment of the present disclosure.

FIG. 5 is a schematic flowchart of a data processing method 500 according to another embodiment of the present disclosure. In a specific implementation process, the data processing method 500 may be performed by, for example, but not limited to, a computer device, and the computer device may be, for example, but is not limited to, a data processing platform or a processing server. Different from the embodiment in FIG. 2, in this embodiment in FIG. 5, the computer device obtains location information of a user that has a target service feature in a user group, that is: does not obtain location information of a user that does not have the target service feature in the user group. The computer device shown in this embodiment in FIG. 5 can more flexibly process, according to a need, location information that meets a condition, rather than process all location information without selection.

S502. For one region in multiple regions, the computer device obtains location information of a user that has a target service feature in a user group, and generates, according to a correspondence between the location information of the user that has the target service feature and the region, a user appearing information bit set corresponding to the region, where the location information indicates a location at which the user appears, bits in the user appearing information bit set are in a one-to-one correspondence with users in the user group, and a bit value of each bit in the user appearing information bit set indicates whether a corresponding user in the user group appears in the region.

Optionally, the location information of the user that has the target service feature includes location information of a user that uses at least one target service in the user group, where the target service includes at least one of a short messaging service, a voice service, a data service, or an application.

For example, the computer device obtains only location information of a user that makes a call in the user group. Alternatively, the computer device obtains only location information of a user that accesses a network in the user group. Alternatively, the computer device obtains only location information of a user that uses a WeChat application in the user group.

Optionally, the location information of the user that has the target service feature includes location information that is of a user in the user group and that is obtained by positioning in a target positioning manner, where the target positioning manner includes at least one of GPS positioning, cell positioning, small cell positioning, Wi-Fi positioning, base station sector positioning, or indoor base station positioning.

For example, the computer device obtains only location information that is of a user in the user group and that is obtained by means of GPS positioning.

A process in which the computer device determines the correspondence between the location information of the user that has the target service feature and the region in S502 is the same as a process in which the correspondence between the location information of the user and the region is determined in S202 in the embodiment of FIG. 2. Therefore, its specific process is not described herein. A process in which the computer device generates a user appearing information bit set in S502 is the same as a process in which a user appearing information bit set is generated in S202 in the embodiment of FIG. 2. Therefore, details are not described herein.

S504. The computer device receives a request message, where the request message carries a region indication parameter.

S506. The computer device queries, according to the region indication parameter, for a user appearing information bit set corresponding to a region indicated by the region indication parameter, and performs data processing according to the found user appearing information bit set.

Specific processes of S504 and S506 are respectively the same as the processes of S204 and S206 in the embodiment of FIG. 2. Therefore, details are not described herein.

According to the technical solution provided in this embodiment of the present disclosure, by obtaining location information of a user that has a target service feature in a user group, a computer device can more flexibly process, according to a need, location information of a user that meets a condition, rather than process all location information without selection, so that the processed data is more targeted, and data storage space can be further reduced.

Figure 6:
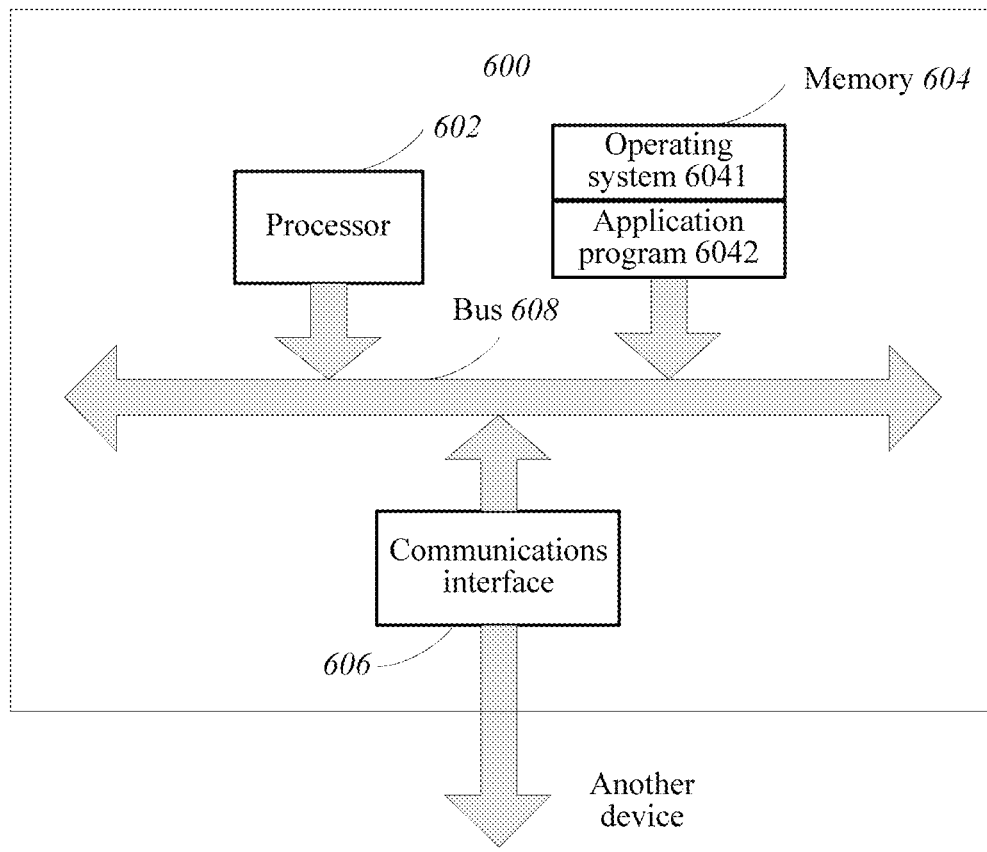
FIG. 6 is a schematic structural diagram of hardware of a general-purpose computer structure according to an embodiment of the present disclosure.

FIG. 6 is a schematic structural diagram of hardware of a general-purpose computer structure 600 according to an embodiment of the present disclosure. As shown in FIG. 6, the general-purpose computer structure 600 includes a processor 602, a memory 604, a communications interface 606, and a bus 608. Communication connections between the processor 602, the memory 604, and the communications interface 606 are implemented using the bus 608.

The processor 602 may be a general-purpose central processing unit (CPU), a microprocessor, an application-specific integrated circuit (ASIC), or one or more integrated circuits to execute a related program, to implement the technical solution provided in this embodiment of the present disclosure.

The memory 604 may be a read-only memory (ROM), a static storage device, a dynamic storage device, or a random access memory (RAM). The memory 604 may store an operating system 6041 and another application program 6042. When the technical solution provided in this embodiment of the present disclosure is implemented using software or firmware, program code for implementing the technical solution provided in this embodiment of the present disclosure is stored in the memory 604, and is executed by the processor 602.

The communications interface 606 uses a receive-and-send apparatus, for example, but is not limited to a transceiver, to implement communication between the interface and another device or communications network.

The bus 608 may include a channel, and transmit information between components (for example, the processor 602, the memory 604, and the communications interface 606).

Figure 7:
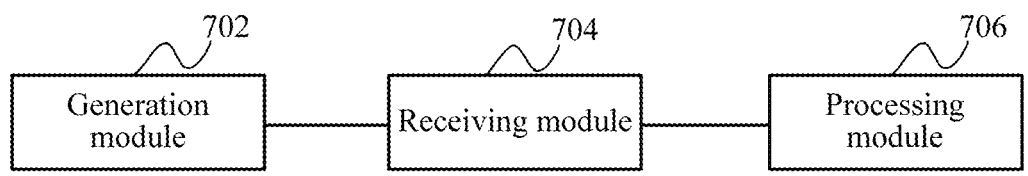
FIG. 7 is a schematic structural diagram of a data processing apparatus according to an embodiment of the present disclosure.

As shown in FIG. 7, when a data processing apparatus includes the foregoing general-purpose computer structure 600, the general-purpose computer structure 600 further includes a generation module 702, a receiving module 704, and a processing module 706 that are used for data processing. These modules may be implemented using hardware, implemented using software, or implemented using software in combination with hardware. Modules used as software are stored in the memory 604 in the general-purpose computer structure 600, and the modules and the memory 604 may be used together as one independent program, or used as independent programs separately. In an optional implementation manner, these software modules may be used separately or together as a part of the application program 6042, or a part of the operating system 6041.

The generation module 702 is configured to, for one region in multiple regions, generate, according to a correspondence between location information of a user in a user group and the region, a user appearing information bit set corresponding to the region, where the location information indicates a location at which the user appears, bits in the user appearing information bit set are in a one-to-one correspondence with users in the user group, and a bit value of each bit in the user appearing information bit set indicates whether a corresponding user in the user group appears in the region.

Optionally, the data processing apparatus further includes an obtaining module, and the obtaining module is configured to obtain location information of a user that has a target service feature in the user group, and the generation module 702 generates, according to a correspondence between the location information of the user that has the target service feature and the region, the user appearing information bit set corresponding to the region.

The receiving module 704 is configured to receive a request message, where the request message carries a region indication parameter.

The processing module 706 is configured to query, according to the region indication parameter, for a user appearing information bit set corresponding to a region indicated by the region indication parameter, and perform data processing according to the found user appearing information bit set.

According to the technical solution provided in this embodiment of the present disclosure, the generation module 702 generates, according to a correspondence between location information of a user in a user group and a region, a user appearing information bit set corresponding to the region, and generates, according to an attribute of the user group, an attribute information bit set corresponding to the attribute, thereby minimizing storage space occupied by each piece of location information and each piece of attribute information, and greatly reducing data storage space. In a manner of dividing a map into regions and dividing a time length into time periods by the generation module 702, to generate a user appearing information bit set, a total quantity of data entries of the user appearing information bit set is fixed, thereby minimizing the data storage space. In a manner of performing data processing by a processing module 706 using a logical operation, a time of analyzing and filtering location information and attribute information is greatly shortened, and computing efficiency and a computing speed are significantly increased.

It should be noted that, although the general-purpose computer structure 600 shown in FIG. 6 shows merely the processor 602, the memory 604, the communications interface 606, and the bus 608, in a specific implementation process, a person skilled in the art should understand that, the foregoing data processing apparatus further includes another component necessary for implementing normal running. Moreover, according to a specific need, a person skilled in the art should understand that, the foregoing data processing apparatus may further include a hardware component for implementing another additional function. In addition, a person skilled in the art should understand that, the foregoing data processing apparatus may also only include components necessary for implementing this embodiment of the present disclosure, but does not necessarily include all components shown in FIG. 6.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data processing method, comprising:
dividing a map into multiple regions;
obtaining, using precise positioning or fuzzy positioning, location information of users in the multiple regions, wherein each of the regions has a same shape and a same area when the map is divided into the multiple regions using precise positioning, and wherein each of the regions has a different shape or a different area when the map is divided into the multiple regions using fuzzy positioning;
generating, according to a correspondence between location information of a user in the user group and a region, a user appearing information bit set corresponding to the region for each region in the multiple regions, wherein the location information indicates a location at which the user appears, wherein bits in the user appearing information bit set are in a one-to-one correspondence with users in the user group, and wherein a bit value of each bit in the user appearing information bit set indicates whether a corresponding user in the user group appears in the region;
receiving a request message, wherein the request message carries a region indication parameter;
querying, according to the region indication parameter, for a user appearing information bit set corresponding to a region indicated by the region indication parameter; and
performing data processing according to the user appearing information bit set.

2. The method according to claim 1, wherein generating the user appearing information bit set corresponding to the region comprises:
obtaining location information of a user that has a target service feature in the user group; and generating, according to a correspondence between the location information of the user that has the target service feature and the region, the user appearing information bit set corresponding to the region.

3. The method according to claim 1, wherein the location information of the user in the user group comprises one of the following two types of information:
   geographic location information of each user in the user group; or
   information indicating that at least one user in the user group appears in the region,
   wherein the map is divided into the multiple regions according to multiple base station sectors, and wherein a location of a base station sector is accessed by the user is used as the location at which the user appears and that is indicated by the geographic location information or the user.

4. The method according to claim 1, wherein the location information of the user in the user group further comprises time information when the user appears at the location in the location information and wherein the method further comprises:
   dividing a time length into M time periods, wherein M is an integer greater than 1; and
   generating, according to a correspondence between the time information in the location information and one time period, a user appearing information bit set corresponding to the time period and the region.

5. The method according to claim 4, wherein the request message further carries a time period indication parameter, and wherein a user appearing information bit set corresponding to a time period indicated by the time period indication parameter and the region indicated by the region indication parameter is queried for according to the time period indication parameter and the region indication parameter.

6. The method according to claim 4, wherein generating the user appearing information bit set corresponding to the time period and the region further comprises determining that different locations at which the user appears within a same time period correspond to different regions, and wherein all bit values that are in user appearing information bit sets of regions at which the user appears within the same time period and that correspond to the user indicate appearing.

7. The method according to claim 1, further comprising, generating an attribute information bit set corresponding to an attribute of at least one attribute in the user group, wherein bits in the attribute information bit set are in a one-to-one correspondence with the users in the user group, and wherein a bit value of each bit in the attribute information bit set indicates whether a corresponding user in the user group has an attribute corresponding to the attribute information bit set.

8. The method according to claim 7, wherein the request message further carries an attribute indication parameter, and wherein the method further comprises:
   querying, according to the attribute indication parameter, for an attribute information bit set corresponding to an attribute indicated by the attribute indication parameter; and
   performing data processing according to the attribute information bit set.

9. The method according to claim 1, wherein the request message further carries a user information indication parameter, wherein the user information indication parameter indicates at least one to-be-selected user, wherein a user filtering information bit set corresponding to the user group is generated according to the user information indication parameter, wherein bits in the user filtering information bit set are in a one-to-one correspondence with the users in the user group, wherein a bit value of each bit in the user filtering information bit set indicates whether to select a corresponding user in the user group, and wherein performing data processing according to the user appearing information bit set further comprises performing data processing according to the user filtering information bit set and the user appearing information bit set.

10. The method according to claim 1, wherein performing data processing comprises performing a logical operation according to the user appearing information bit set and a logical operator indication parameter in the request message.

11. A data processing apparatus, comprising:
    a processor; and
    a computer-readable storage medium coupled to the processor and configured to store programming instructions for execution by the processor, wherein the programming instructions comprise:
      instructions for dividing a map into multiple regions;
      instructions for obtaining, using precise positioning for fuzzy positioning, locations of users in the multiple regions, wherein each of the regions has a same shape and a same area when the map is divided into the multiple regions using precise positioning, and wherein each of the regions has a different shape or different area when the map is divided into the multiple regions using fuzzy positioning;
      instructions for generating, for each region in the multiple regions, according to a correspondence between location information of a user in a user group and the region, a user appearing information bit set corresponding to the region, wherein the location information indicates a location at which the user appears, wherein bits in the user appearing information bit set are in a one-to-one correspondence with the users in the user group, and wherein a bit value of each bit in the user appearing information bit set indicates whether a corresponding user in the user group appears in the region;
      instructions for receiving a request message, wherein the request message carries a region indication parameter; instructions for querying, according to the region indication parameter, for a user appearing information bit set corresponding to a region indicated by the region indication parameter; and
      instructions for performing data processing according to the user appearing information bit set.

12. The apparatus according to claim 11, wherein the programming instructions further comprise instructions for obtaining location information of a user that has a target service feature in the user group, and wherein the instructions for generating the user appearing information bit set corresponding to the region comprises instructions for generating, according to a correspondence between the location information of the user that has the target service feature and the region, the user appearing information bit set corresponding to the region.

13. The apparatus according to claim 11, wherein the location information of the user in the user group comprises one of the following two types of information:
    geographic location information of each user in the user group; or
    information indicating that at least one user in the user group appears in the region, wherein the map is divided into the multiple regions according to multiple base station sectors, and wherein a location of a base station sector accessed by the user is used as the location at which the user appears and that is indicated by the geographic location information of the user.

14. The apparatus according to claim 11, wherein the location information of the user in the user group further comprises a time information when the user appears at the location in the location information, and wherein the processor is further configured to:
divide a time length into M time periods, wherein M is an integer greater than 1; and
generate, according to a correspondence between the time information in the location information and one time period, a user appearing information bit set corresponding to the time period and the region.

15. The apparatus according to claim 14, wherein the request message further carries a time period indication parameter, and wherein the programming instructions further comprise instructions for querying, according to the time period indication parameter and the region indication parameter, for a user appearing information bit set corresponding to a time period indicated by the time period indication parameter and the region indicated by the region indication parameter.

16. The apparatus according to claim 14, wherein the instructions for generating the user appearing information bit set corresponding to the time period and the region comprises instructions for determining that different locations at which the user appears within a same time period correspond to different regions, wherein all bit values that are in user appearing information bit sets of regions at which the user appears within the same time period and that correspond to the user indicate appearing.

17. The apparatus according to claim 11, wherein the programming instructions further comprise instructions for generating, for one attribute of at least one attribute in the user group, an attribute information bit set corresponding to the attribute, wherein bits in the attribute information bit set are in a one-to-one correspondence with the users in the user group, and wherein a bit value of each bit in the attribute information bit set indicates whether a corresponding user in the user group has an attribute corresponding to the attribute information bit set.

18. The apparatus according to claim 17, wherein the request message further carries an attribute indication parameter, and wherein the programming instructions further comprise:
instructions for querying, according to the attribute indication parameter, an attribute information bit set corresponding to an attribute indicated by the attribute indication parameter; and
instructions for performing data processing according to the attribute information bit set.

19. The apparatus according to claim 11, wherein the request message further carries a user information indication parameter, wherein the user information indication parameter indicates at least one to-be-selected user, wherein the programming instructions further comprising instructions for generating, according to the user information indication parameter, a user filtering information bit set corresponding to the user group, wherein bits in the user filtering information bit set are in a one-to-one correspondence with the users in the user group, wherein a bit value of each bit in the user filtering information bit set indicates whether to select a corresponding user in the user group, and wherein the programming instructions further comprise instructions for performing data processing according to the user filtering information bit set and the user appearing information bit set.

20. The apparatus according to claim 11, wherein the instructions for performing data processing further comprise instructions for performing a logical operation according to the user appearing information bit set and a logical operator indication parameter in the request message.

* * * * *

UNITED STATES PATENT AND TRADEMARK OFFICE
CERTIFICATE OF CORRECTION

PATENT NO. : 10,783,203 B2
APPLICATION NO. : 15/823024
DATED : September 22, 2020
INVENTOR(S) : Chibing Chen et al.

Page 1 of 1

It is certified that error appears in the above-identified patent and that said Letters Patent is hereby corrected as shown below:

In the Claims

Claim 11, Column 24, Line 23: "precise positioning for" should read "precise positioning or"

Signed and Sealed this
Tenth Day of November, 2020

Andrei Iancu
*Director of the United States Patent and Trademark Office*